United States Patent
Mochizuki et al.

(10) Patent No.: US 9,305,586 B2
(45) Date of Patent: Apr. 5, 2016

(54) MICROWAVE-ASSISTED MAGNETIC RECORDING DEVICE AND METHOD OF FORMATION THEREOF

(71) Applicant: HGST Netherlands B.V., Amsterdam (NL)

(72) Inventors: Masafumi Mochizuki, Chigasaki (JP); Masukazu Igarashi, Kawagoe (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/724,914

(22) Filed: Dec. 21, 2012

(65) Prior Publication Data

US 2013/0114384 A1 May 9, 2013

Related U.S. Application Data

(63) Continuation-in-part of application No. 12/698,834, filed on Feb. 2, 2010, now Pat. No. 8,363,355.

(30) Foreign Application Priority Data

Feb. 4, 2009 (JP) ................................. 2009-024059

(51) Int. Cl.
G11B 5/31 (2006.01)
G11B 13/04 (2006.01)
G11B 5/00 (2006.01)

(52) U.S. Cl.
CPC .............. *G11B 13/045* (2013.01); *G11B 5/314* (2013.01); *G11B 5/3146* (2013.01); *G11B 2005/0002* (2013.01); *G11B 2005/0024* (2013.01)

(58) Field of Classification Search
USPC ............................................. 360/125.3, 128
See application file for complete search history.

(56) References Cited

U.S. PATENT DOCUMENTS

| 7,957,098 B2 * | 6/2011 | Yamada et al. ............ 360/125.3 |
| 7,982,996 B2 * | 7/2011 | Smith et al. ..................... 360/59 |
| 8,081,397 B2 * | 12/2011 | Funayama et al. ....... 360/125.08 |
| 8,094,399 B2 * | 1/2012 | Roppongi et al. .............. 360/55 |

(Continued)

FOREIGN PATENT DOCUMENTS

| JP | 2006190474 A | 7/2006 |
| JP | 2008-277586 | 11/2008 |

(Continued)

OTHER PUBLICATIONS

Zhu et al., "Microwave Assisted Magnetic Recording," IEEE Transactions on Magnetics, vol. 44, No. 1, Jan. 2008.

(Continued)

*Primary Examiner* — Brian Miller
(74) *Attorney, Agent, or Firm* — Zilka-Kotab, PC

(57) ABSTRACT

A magnetic head, according to one embodiment, includes a magnetized high-speed rotor placed in the vicinity of a main magnetic pole, wherein the main magnetic pole generates a magnetized rotating magnetic field, wherein information is recorded by generating a high-frequency magnetic field from the magnetized high-speed rotor and switching the magnetic head between a magnetic resonance state and a magnetization state, and wherein the magnetic head has a structure such that leaking is reduced for magnetic fields applied parallel to a magnetized rotating surface of the magnetized high-speed rotor from the main magnetic pole. Additional systems and methods are also presented.

19 Claims, 15 Drawing Sheets

(56) References Cited

U.S. PATENT DOCUMENTS

| | | | |
|---|---|---|---|
| 8,107,352 B1* | 1/2012 | Yamanaka et al. | 369/112.27 |
| 8,139,322 B2* | 3/2012 | Yamada et al. | 360/125.3 |
| 8,159,769 B2* | 4/2012 | Batra et al. | 360/59 |
| 8,363,355 B2* | 1/2013 | Mochizuki et al. | 360/125.3 |
| 8,446,691 B2* | 5/2013 | Takagishi et al. | 360/125.3 |
| 8,456,967 B1* | 6/2013 | Mallary | 369/13.33 |
| 8,537,497 B2* | 9/2013 | Nagasaka et al. | 360/125.3 |
| 8,547,662 B2* | 10/2013 | Yamada et al. | 360/125.3 |
| 8,773,818 B2* | 7/2014 | Taguchi et al. | 360/125.3 |
| 2008/0112087 A1* | 5/2008 | Clinton et al. | 360/317 |
| 2008/0268291 A1* | 10/2008 | Akiyama et al. | 428/812 |
| 2009/0225465 A1* | 9/2009 | Iwasaki et al. | 360/75 |
| 2009/0257151 A1* | 10/2009 | Zhang et al. | 360/324.2 |
| 2009/0310244 A1* | 12/2009 | Shimazawa et al. | 360/75 |
| 2009/0316304 A1 | 12/2009 | Funayama et al. | |
| 2010/0073804 A1* | 3/2010 | Ikeda et al. | 360/59 |
| 2010/0195247 A1 | 8/2010 | Mochizuki et al. | |
| 2010/0296194 A1* | 11/2010 | Gubbins et al. | 360/125.43 |
| 2011/0038080 A1* | 2/2011 | Alex et al. | 360/123.02 |
| 2011/0043943 A1* | 2/2011 | Igarashi et al. | 360/59 |
| 2011/0090603 A1* | 4/2011 | Bai | 360/319 |
| 2011/0116184 A1* | 5/2011 | Yasui et al. | 360/59 |
| 2011/0216435 A1* | 9/2011 | Shiimoto et al. | 360/59 |
| 2011/0242696 A1* | 10/2011 | Ikeda et al. | 360/59 |
| 2011/0255197 A1* | 10/2011 | Tsuchiya et al. | 360/245.3 |
| 2011/0273800 A1* | 11/2011 | Takano et al. | 360/125.12 |
| 2011/0299192 A1* | 12/2011 | Yamada et al. | 360/75 |

FOREIGN PATENT DOCUMENTS

| | | |
|---|---|---|
| JP | 2010003353 A | 1/2010 |
| WO | 03/010758 A1 | 2/2003 |

OTHER PUBLICATIONS

"Digest of the 18th Magnetic Recording Conference: Heads and Systems," TMRC-2007-B7, May 21-23, 2007.

Restriction/Election Requirement from U.S. Appl. No. 12/698,834 dated Mar. 6, 2012.

Non-Final Office Action from U.S. Appl. No. 12/698,834 dated May 3, 2012.

Final Office Action from U.S. Appl. No. 12/698,834 dated Sep. 24, 2012.

Notice of Allowance and Fee(s) Due from U.S. Appl. No. 12/698,834 dated Oct. 19, 2012.

* cited by examiner

A           current
B           flare point

| A | Magnetic field strength[x 1000 / 4πA/m] |
| B | Direction of head element height (nm) |
| C | Conventional example |
| D | The present invention |

A   Magnetic field strength [x 1000/4π A/m]

B   Direction of head element height (nm)

C   Conventional example

D   The present invention

A    flare point
B    air bearing surface processing region

A  Reduction (%) in the magnetic fields at the microwave generation position and the recording layer position of the structure of the present invention compared to the conventional structure
B  Angle (deg.)
C  microwave generation position
D  recording layer position A Reduction (%) in the magnetic fields at the microwave generation position and the recording layer position of the structure of the present invention compared to the conventional structure
B Angle (deg.)
C microwave generation position
D recording layer position

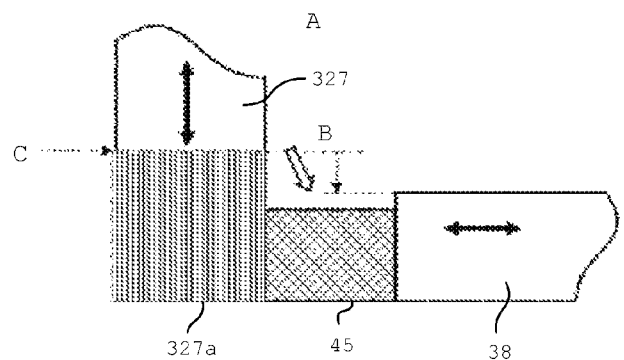
FIG. 16 (A)
(prior art)
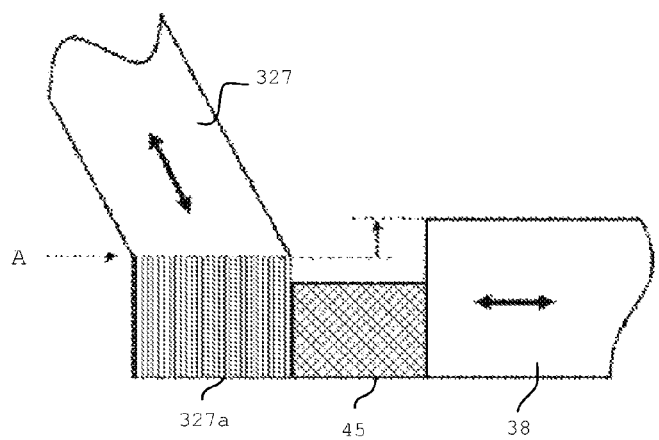
FIG. 16 (B)
Figure 16 (A)
A   arrows indicate the direction of magnetization
B   leaking magnetic field
C   throttle position
Figure 16(B)
A   throttle position

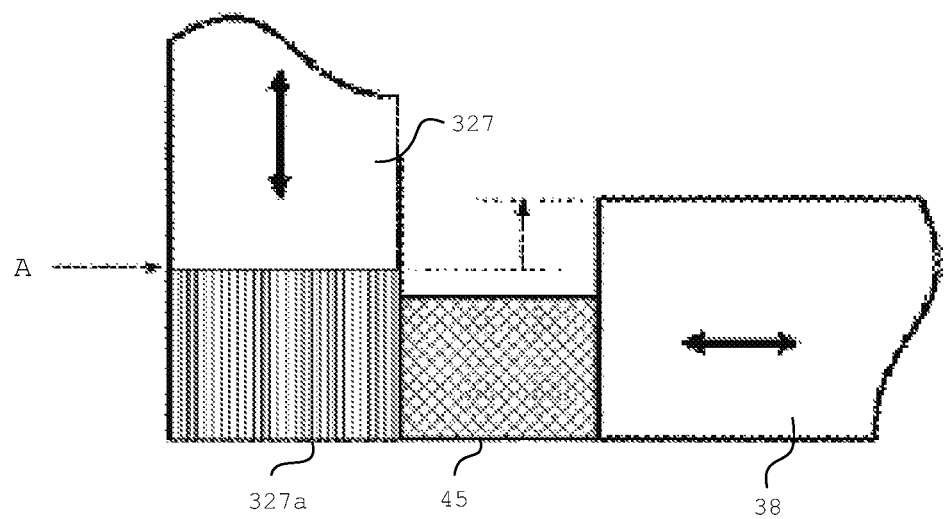
FIG. 16 (C)
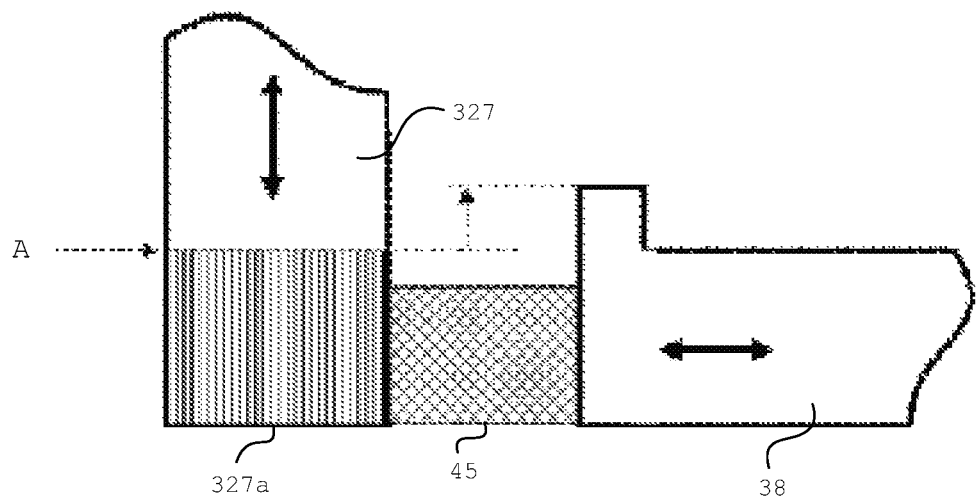
FIG. 16 (D)
Figure 16(C)
A    flare point
Figure 16(D)
A    flare point

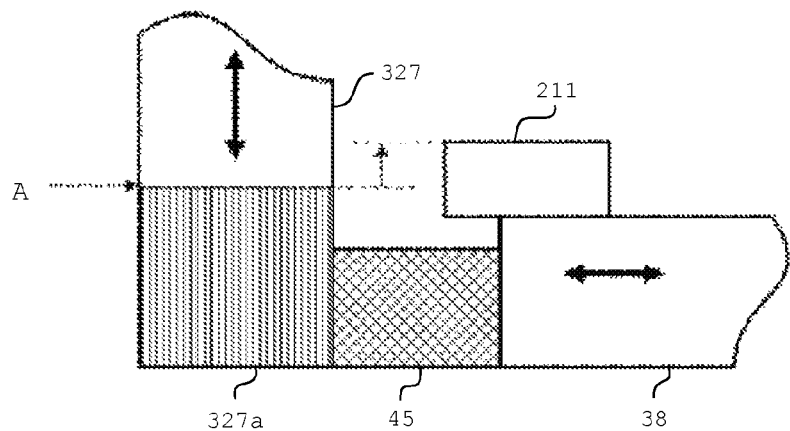
Figure 16 (E)
A    flare point
FIG. 16 (E)
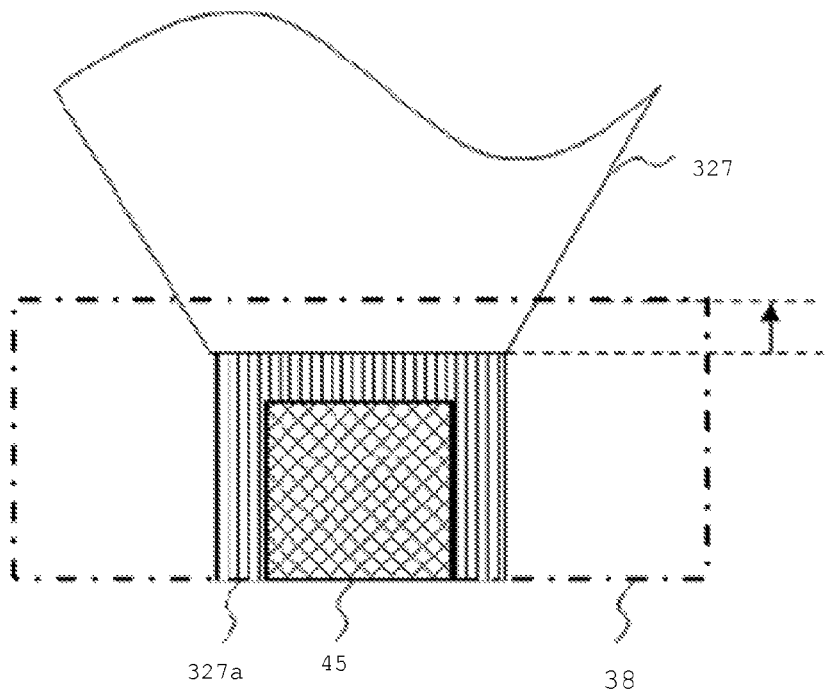
FIG. 17

MICROWAVE-ASSISTED MAGNETIC RECORDING DEVICE AND METHOD OF FORMATION THEREOF

RELATED APPLICATIONS

The present application is a continuation-in-part of U.S. patent application Ser. No. 12/698,834 filed Feb. 2, 2010, which is herein incorporated, by reference. The present application also claims priority to a Japanese Patent Application filed Feb. 4, 2009, under Appl. No. 2009-024059, which is incorporated herein by reference.

FIELD OF THE INVENTION

The present invention relates to a magnetic head and to a magnetic recording head provided with a microwave-assisted recording mechanism.

BACKGROUND OF THE INVENTION

Over the past few years, progress in higher recording densities for magnetic disk devices has, been remarkable. Accompanying this progress is the development of narrower magnetic poles which are included in magnetic recording heads, which has been striking. However, a problem is that the requisite recording magnetic field strength becomes difficult to achieve as the magnetic pole becomes narrower because the recording, magnetic field strength generated by a magnetic recording head is correlated to the volume of the magnetic pole.

One solution to this problem is a thermally assisted magnetic recording method. Thermally assisted recording lowers the magnetic field strength required to write by heating the magnetic recording medium and lowering the coercive force while recording. Recently, microwave-assisted recording has been proposed as another assisted recording method for achieving recording densities of at least 1 $Tb/in^2$. For example, microwave-assisted recording methods which employ spin torque oscillation are proposed in WIPO Pub. No. WO03/010758A1 Digest of the 18th Magnetic Recording Conference: Heads and Systems, TMRC-2007-B7, May 21-23 (2007); and Jian-Gang Zhu, Xiaochun Zhu, and Yuhui Tang, *IEEE Transactions Magnetics*, Vol. 44, No. 1, pp. 125-131 (2008). In this method, a magnetized high-speed rotor in which magnetization is rotated at high speed by the spin torque is arranged adjacent to the main magnetic pole of a vertical magnetic recording head, microwaves irradiate a magnetic recording medium, and information is recorded on the magnetic recording medium which has large magnetic anisotropy. The magnetic field required for magnetization reversal of the medium is reduced by applying microwaves generated by an oscillator to the medium. The required recording magnetic field strength which is generated by the main magnetic pole of the magnetic recording head exhibits a lower strength than previous heads.

In microwave-assisted recording, strong microwaves can irradiate, a region on the order of nanometers of a magnetic recording medium, locally establish a magnetic resonance state, and reduce the magnetic field for magnetization reversal to record information. Since both the microwaves and the magnetic field from the main magnetic pole are used to record magnetized bits, a microwave (high-frequency magnetic. Add) generator may be positioned in the vicinity of the main magnetic pole and may be affected by a large magnetic field from the main magnetic pole. When the microwave generator is affected by a large magnetic field, there are problems from the perspectives of performance and reliability such as the magnetization of the magnetic body in the microwave, generator being oriented in one direction, and the magnetization not rotating efficiently.

In light of the above situation, it would be beneficial to the art of microwave assisted magnetic recording to provide a magnetic recording head which overcomes the problems associated with conventional microwave assisted designs.

SUMMARY OF THE INVENTION

In one embodiment, a magnetic head includes a microwave generator, a main magnetic pole, an auxiliary magnetic pole, and a coil wound around a magnetic circuit, the magnetic circuit including the main magnetic pole and the auxiliary magnetic pole. The microwave generator has a magnetic film provided near an air bearing surface end of the main magnetic pole. A first distance in an element thickness direction between film surfaces of the magnetic film and the main magnetic pole at an end of the magnetic film opposite an air bearing surface end of the magnetic film is greater than a second distance in an element thickness direction between film surfaces of the magnetic film and the main magnetic pole at the air bearing surface end of the magnetic film.

In another embodiment, a magnetic head includes a microwave generator provided with a main magnetic pole, an auxiliary magnetic pole, and a coil wound around a magnetic circuit, the magnetic circuit including the main magnetic pole and the auxiliary magnetic pole. The microwave generator has a magnetic film provided near an air bearing surface end of the main magnetic pole. The main magnetic pole has a shape in which a width is nearly constant from the air bearing surface end to a flare point of the main magnetic pole, and gradually widens from the flare point in an element height direction. Also, the magnetic head has a first distance between film surfaces of the magnetic film and the main magnetic pole at the flare point of the main magnetic pole that is greater than a second distance between film surfaces of the magnetic film and the main magnetic pole at an air bearing surface end of the magnetic film.

In another embodiment, a method for forming a portion of a magnetic head includes forming a main magnetic pole, forming a nonmagnetic film above an air bearing surface end of the main magnetic pole, and forming a magnetic film comprising a microwave generator above the nonmagnetic film. A first distance in an element thickness direction between film surfaces of the magnetic film and the main magnetic pole at an end of the magnetic film opposite an air bearing surface end of the magnetic film is greater than a second distance in an element thickness direction between film surfaces of the magnetic film and the main magnetic pole at the air bearing surface end of the magnetic film.

According to another embodiment, a magnetic head includes a magnetized high-speed rotor placed in the vicinity of a main magnetic pole, wherein the main magnetic pole generates a magnetized rotating magnetic field, information is recorded by generating a high-frequency magnetic field from the magnetized high-speed rotor and switching the magnetic head between a magnetic resonance state and a magnetization state, and the magnetic head has a structure such that leaking is reduced for magnetic fields applied parallel to a magnetized rotating surface of the magnetized high-speed rotor from the main magnetic pole.

In yet another embodiment, a magnetic head includes a magnetized high-speed rotor placed in the vicinity of a main magnetic pole, wherein the main magnetic pole generates a reverse magnetic field, and information is recorded by generating a high-frequency magnetic field from the magnetized high-speed rotor and switching the magnetic head between a magnetic resonance state and a magnetization state, and a height of a magnetic pole opposite the main magnetic pole is greater at an air bearing surface than at a flare point of the main magnetic pole.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

FIGS. 16(A)-(E) includes views of structures of a portion of a magnetic head, according to several embodiments.

FIG. 17 is a view of a portion of a magnetic head as viewed in the direction of the pole section from the end surface of the magnetic pole on the pole section side, according to one embodiment.

DETAILED DESCRIPTION

Figure 1:
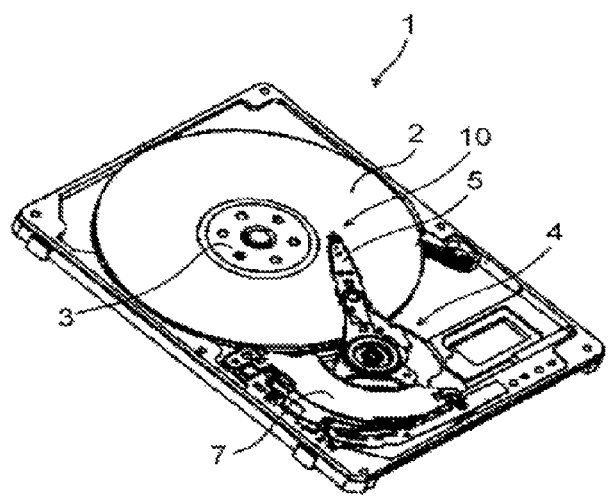
FIG. 1 is a perspective view of a magnetic disk device, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a magnetic head includes a microwave generator, a main magnetic pole, an auxiliary magnetic pole, and a coil wound around a magnetic circuit, the magnetic circuit including the main magnetic pole and the auxiliary magnetic pole. The microwave generator has a magnetic film provided near an air hearing surface end of the main magnetic pole. A first distance in an element thickness direction between film surfaces of the magnetic film and the main magnetic pole at an end of the magnetic film opposite an air bearing surface end of the magnetic film is greater than a second distance in an element thickness direction between film surfaces of the magnetic film and the main magnetic pole at the air bearing surface end of the magnetic film.

In another general embodiment, a magnetic head includes a microwave generator provided with a main magnetic pole, an auxiliary magnetic pole, and a coil wound around a magnetic circuit, wherein the magnetic circuit includes the main magnetic pole and the auxiliary magnetic pole. The microwave generator has a magnetic film provided near an air bearing surface end of the main magnetic pole. The main magnetic pole has a shape in which a width is nearly constant from the air bearing surface end to a flare point of the main magnetic pole, and gradually widens from the flare point in an element height direction. Also, the magnetic head has a first distance between film surfaces of the magnetic film and the main magnetic pole at the flare point of the main magnetic pole that is greater than a second distance between film surfaces of the magnetic film and the main magnetic pole at an air bearing surface end of the magnetic film.

In another general embodiment, a method for forming a portion of a magnetic head includes forming a main magnetic pole, forming a nonmagnetic film above an air bearing surface end of the main magnetic pole, and forming a magnetic film comprising a microwave generator above the nonmagnetic film. A first distance in an element thickness direction between film surfaces of the magnetic film and the main magnetic pole at an end of the magnetic film opposite an air bearing surface end of the magnetic film is greater than a second distance in an element thickness direction between film surfaces of the magnetic film and the main magnetic pole at the air bearing surface end of the magnetic film.

According to another general embodiment, as magnetic head includes a magnetized high-speed rotor placed in the vicinity of a main magnetic pole, wherein the main magnetic, pole generates a magnetized rotating magnetic field, information is recorded by generating a high frequency magnetic field from the magnetized high-speed rotor and switching the magnetic head between a magnetic resonance state and a magnetization state, and the magnetic head has a structure such that leaking is reduced for magnetic fields applied parallel to a magnetized rotating surface of the magnetized high-speed rotor from the main magnetic pole.

In yet another general embodiment, a magnetic head includes a magnetized high-speed rotor placed in the vicinity of a main magnetic pole, wherein the main magnetic pole generates a reverse magnetic field, and information is recorded by generating a high-frequency magnetic field from the magnetized high-speed rotor and switching the magnetic head between a magnetic resonance state and a magnetization state, and a height of a magnetic pole opposite the main magnetic pole is greater at an air hearing surface than at a flare point of the main magnetic pole.

In another approach, a magnetic head includes a microwave generator which is provided near the head air bearing surface side of the main magnetic pole. The microwave generator is provided with a magnetic film and uses spin torque to rotate the direction of magnetization of the magnetic film to generate microwaves.

In another approach, a distance between film surfaces of the magnetic film which comprise the microwave generator and the main magnetic pole is larger at the top end in the element height direction of the microwave generator than at the head air bearing surface. Alternately, the main magnetic pole may have a shape in which the width is nearly constant from the head air bearing surface to the flare point and may gradually widen in the direction from the flare point to the element height. The distance between film surfaces of the magnetic film which comprise, the microwave generator and the main magnetic pole may be larger at the flare point of the main magnetic pole than at the head air bearing surface.

According to one embodiment, the magnetic field which is applied to the microwave generator from the main magnetic pole may be reduced without significantly reducing the recording magnetic field strength.

While various embodiments have been described above, it should be understood that they have been presented by way of example only, and do not limit it the invention in any manner. Thus, the breadth and scope of any embodiment should not be limited by any of the above-described exemplary embodiments, but should be defined only in accordance with the following claims and their equivalents.

Embodiments of a head slider for mounting the magnetic recording head, according to one embodiment, a head assembly, and a magnetic disk device, are described with reference to the drawings.

FIG. 1 is a perspective view of a magnetic disk device 1, according to one embodiment. The top cover is not depicted in FIG. 1. A magnetic recording medium 2 and a head assembly 4 are housed in the cabinet of the magnetic disk device 1. The magnetic recording medium 2 is installed on a spindle motor 3 provided at the bottom of the cabinet. The head assembly 4 is rotatably supported next to the magnetic recording medium 2. A suspension arm 5 is provided on the front end of the head assembly 4, and a head slider 10 is supported by the front end of the arm. In addition, a voice coil motor 7 is provided on the back end of the head assembly 4. The voice coil motor 7 drives the rotation of the head assembly 4 and moves the head slider 10 in approximately the radial direction above the magnetic recording medium 2.

Figure 2:
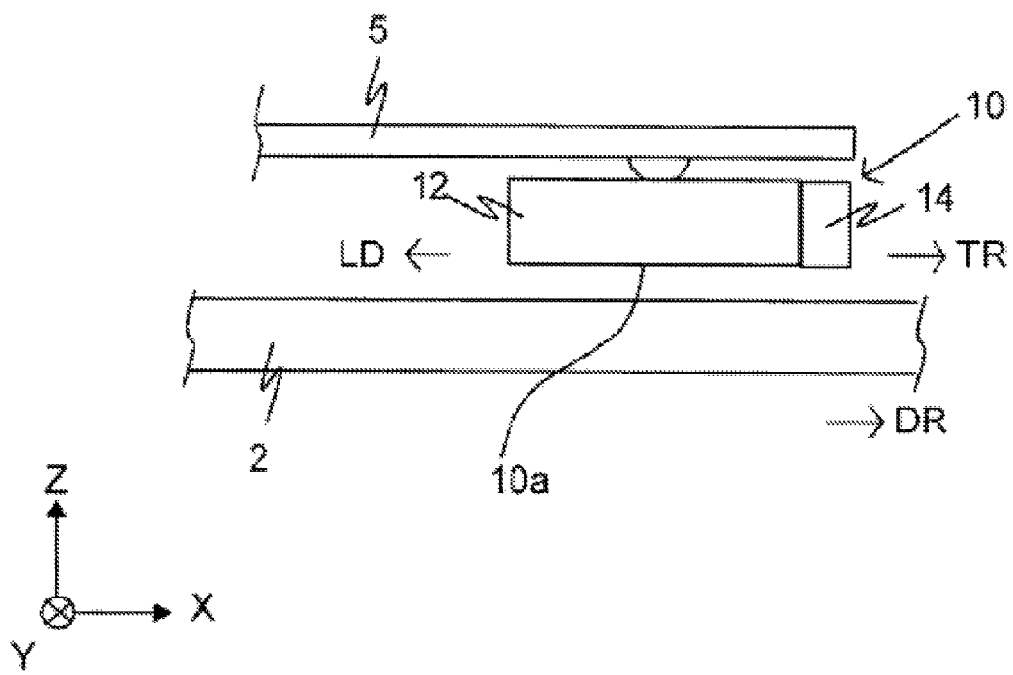
FIG. 2 is a view showing the front end of a head assembly, according to one embodiment.

FIG. 2 is a schematic view showing the front end of the head assembly 4, according to one embodiment. The X, Y, and Z directions in the drawing represent the lengthwise direction, the width direction, and the thickness direction, respectively, of the head slider 10. Of these, the Z direction corresponds to the flying direction of the head slider 10. Essentially, the X and Y directions correspond to the direction of rotation and the radial direction, respectively, of the magnetic recording medium 2 (namely, the extension direction and the width direction of the tracks). Arrow DR indicates the direction of rotation of the magnetic recording medium 2. Arrow TR indicates the trailing direction of the head slider 10. Arrow LD indicates the leading direction of the head slider 10.

The head slider 10 is supported by the front end of the suspension arm 5. The head air bearing surface 10a opposite the disk-shaped medium 2 is the air bearing surface (ABS) of the head slider 10, and the head slider 10 flies due to the wedge film effect of a gas such as air above the disk-shaped medium 2 which is rotating. The head slider 10 has a slider substrate 12 having a flat parallelepiped shape composed of a sintered compact (so-called AlTiC) of alumina and titanium carbide, and a thin film member 14 formed by a thin-film forming technology on the end surface on the trailing side of the slider substrate 12.

Figure 3:
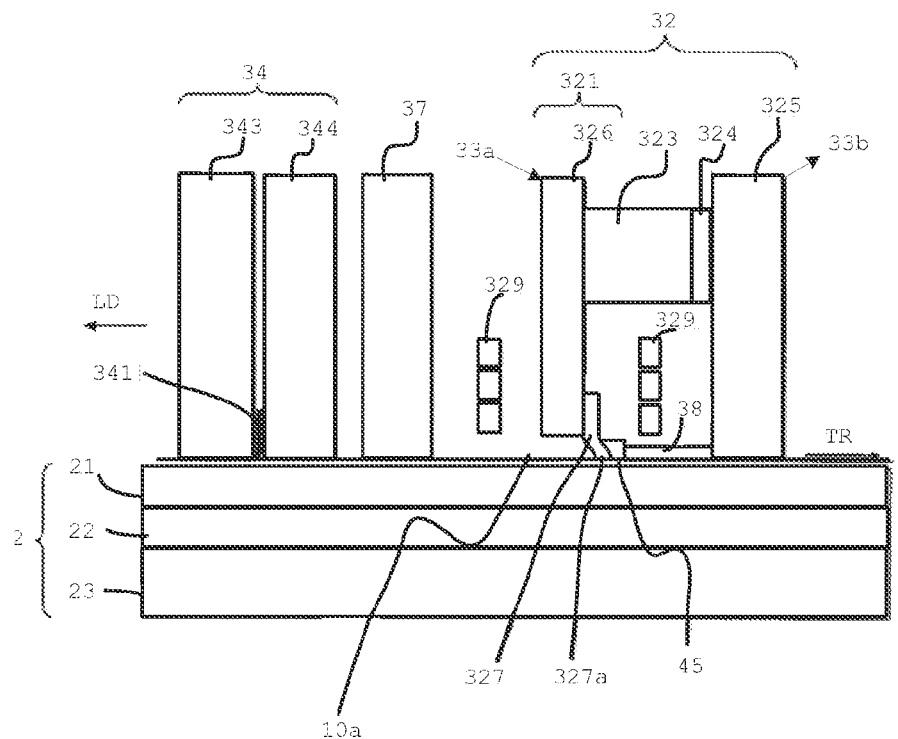
FIG. 3 is a cross-sectional view of a magnetic head related to one embodiment.

FIG. 3 is a cross-sectional schematic view showing some parts of the thin film member 14 provided in the trailing part of the head slider 10, according to one embodiment. In a recording head 32, a pillar 323 composed of a magnetic body and an insulating body 324 may be arranged between a main magnetic pole 321 and an auxiliary magnetic pole 325. The main magnetic pole 321, the auxiliary magnetic pole 325, and the pillar 323 may be composed of a soft magnetic material such as permalloy, CoFe alloy, etc. Preferably, the insulating body 324 is thinned so that the main magnetic pole 321, the auxiliary magnetic pole 325, and the pillar 323 are coupled magnetically. There is almost no deterioration in the magnetic field strength applied to the recording medium even if the insulating body 324 is approximately 1 μm. A pole section 327 is provided in the main magnetic pole 321 to be in contact with a yoke 326. The pole section 327 extends to the head air bearing surface 10a, and the end surface 327a of the pole section is exposed to the head an bearing surface 10a. A magnetic body 38 for creating a steep magnetic field gradient is provided on the trailing side of the pole section 327. The magnetic body 38 may be provided on only the trailing side of the pole section 327, or surround the pole section 327 on three sides of the trailing side of the pole section 327 and on both sides in the track width direction. A reproducing head 34 includes a reproducing element 341 composed of a magnetoresistance effect element and a pair of magnetic shields 343, 344 which sandwich the element. In addition, a shield 37 composed of a magnetic body is arranged with the objective of reducing the flowing of the recording magnetic field into the magnetic shield 344.

Further, a magnetic film comprising a microwave generator 45 which uses spin torque is provided in the thin film member 14. The magnetic film comprising the microwave generator 45 is installed on the trailing side of the front end of the pole section 327. The magnetic film comprising the microwave generator 45 locally irradiates microwaves on the magnetic recording medium 2, excites magnetic resonance at the irradiated location, and facilitates the reversal of the direction of magnetization. The microwave excitation current flows from the yoke 326 or the pole section 327 through the microwave generator 45 to the auxiliary magnetic pole 325 and flows, for example, as indicated by arrows 33a, 33b.

The main magnetic pole 321 is magnetized by a coil 329 wrapped around a magnetic circuit which includes the main magnetic pole 321 and the auxiliary magnetic pole 325, in the example in the drawing, by the coil 329 which encloses and wraps around the yoke 326, and generates the recording magnetic field from the end surface. 327a of the pole section 327. The recording magnetic field generated from the pole section 327 vertically penetrates a magnetic recording layer 21 and an intermediate layer 22 of the magnetic disk 2, is returned by the soft magnetic backing layer 23, and is absorbed by the auxiliary magnetic pole 325. The recording magnetic field generated by the pole section 327 is applied to the magnetic recording layer 21, and the microwaves generated by the microwave generator 45 irradiate the magnetic recording layer 21 to write the recording magnetization. During recording, the microwaves and the recording magnetic field may be irradiated, or the desired recording magnetic field may be irradiated during recording while the microwaves are irradiated continuously, or the desired recording magnetic field may be irradiated continuously while the microwaves are irradiated during recording, etc. in microwave-assisted recording, a recording medium which has large magnetic anisotropy may be used so that recording is not possible in the absence of both the recording magnetic field from the pole section 327 of the main magnetic pole and the microwave magnetic field emitted by the microwave generator 45.

Figure 4:
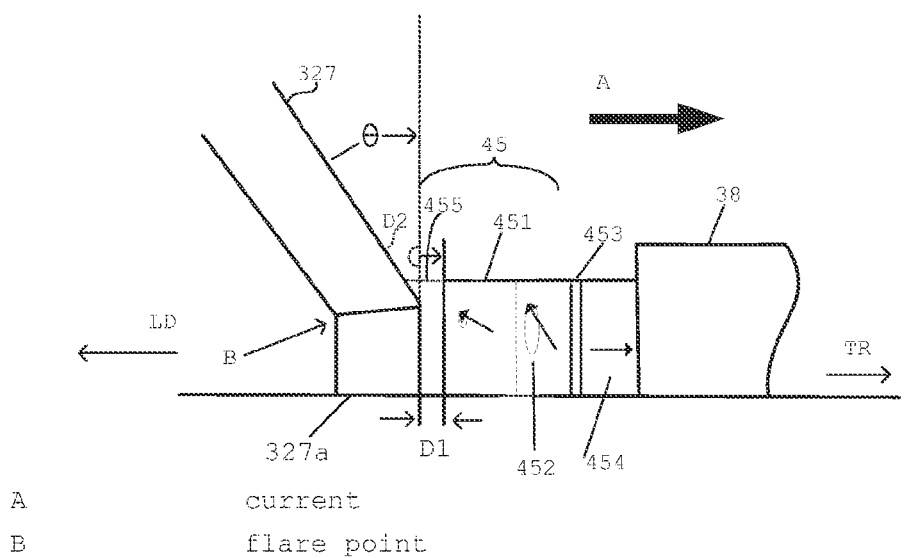
FIG. 4 is a view showing an example of the structure of the main magnetic pole and the microwave generator in a magnetic head, according to one embodiment.
Figure 5:
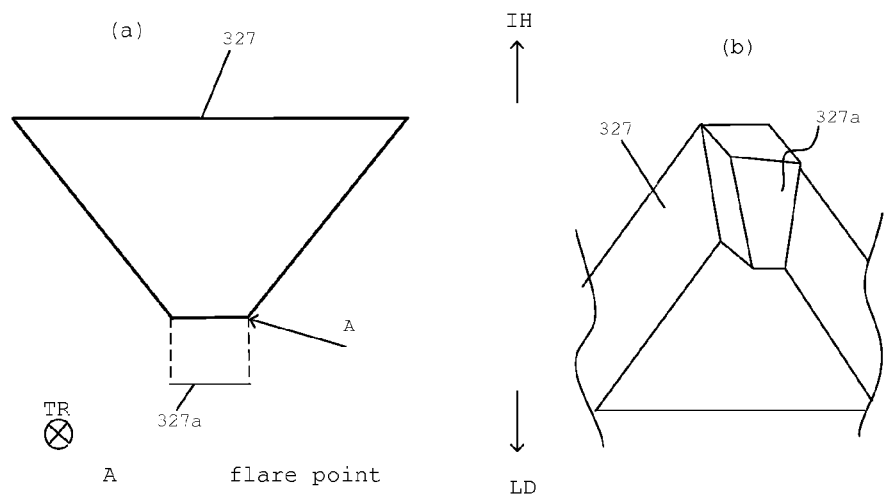
FIG. 5 is an explanatory view of the pole section of the main magnetic pole, according to one embodiment.

FIG. 4 is an enlarged cross-sectional view showing an example of the structure of the main magnetic pole and the microwave generator in the magnetic recording head, according to one embodiment. FIG. 5(a) is a top view of the pole section 327 provided on the front end of the main magnetic pole, according to one embodiment. FIG. 5(b) is a perspective view, according to one embodiment.

A microwave generator 45 comprised of the layers of a vertical magnetic anisotropic body 451, a magnetized high-speed rotor 452, a non-magnetic metal layer 453 (spin conducting layer), a vertical magnetic anisotropic body 454 (spin injection layer), and a non-magnetic metal layer 455 (spin conducting, layer) is arranged between the pole section 327 of the main magnetic pole and the magnetic body 38. The microwave generator 45 is provided with a means for electrically connecting the pole section 327 of the main magnetic pole and the magnetic body 38 and is constructed so that the microwave excitation current flows from the main magnetic pole 327 side to the magnetic body 38 side, or in the reverse direction. The layers which become electrodes may be provided between the pole section 327 of the main magnetic pole and the microwave generator 45, and between the magnetic body 38 and the microwave generator 45.

A hexagonal crystal such as CoCrPt, etc., may be used as the vertical magnetic anisotropic hod 451. The magnetized high-speed rotor 452 is, for example, a CoFe alloy having a thickness which has a large saturation magnetization and almost no crystal magnetic anisotropy. For example, the thickness may be approximately 20 nm. Ruthenium (Ru) or copper (Cu), etc., which is a non-magnetic metal having high spin conductance, may be used in the non-magnetic metal spin conducting layer 455 and the non-magnetic metal spin conducting layer 453. CoPt, etc., may be used in the vertical magnetic anisotropic body 454 (spin injection layer), in the magnetized high-speed rotor 452, the magnetization rotates at high speed in the surface along the layer. The leakage magnetic field from the magnetic pole emerging, at the air bearing surface acts as the microwaves (high-frequency magnetic field). The magnetization rotation drive source of the magnetized high-speed rotor 452 is the spin torque which flows in through the non-magnetic metal spin conducting layer 453 from the vertical magnetic anisotropic body 454 (spin injection layer) in addition, the spin torque which flows in through the non-magnetic metal spin conducting layer 455 from the pole section 327 of the main magnetic pole acts in the direction in which the effect of the leakage magnetic field from the main magnetic pole decreases. To obtain these actions of the spin torque, the microwave excitation current must flow from the main magnetic pole 327 side to the magnetic body 38 side. The spin torque action increases as the microwave excitation current (electron flow) increases.

In this embodiment, the pole section 327 of the main magnetic pole is formed perpendicular to the air bearing surface (parallel to the vertical magnetic anisotropic body 451 of the microwave generator 45) from the end surface 327a to the flare point. The top part in the element height direction from the flare point is formed at an angle θ from the surface perpendicular to the air bearing surface (parallel surface to the film surface of the vertical magnetic anisotropic body 451 of the microwave generator 45) in the direction away from the microwave generator 45. Therefore, the constitution is such that the distance between film surfaces D2 of the magnetic film 451 which comprises the microwave generator 45 and the trailing end of the main magnetic pole 327 on the top end in die element height direction of the microwave generator 45 is larger than the distance between film surfaces D1 of the magnetic film 451 which comprises the microwave generator 45 and the trailing end of the main magnetic pole 327 on the head air bearing surface 10a. By employing this arrangement, the magnetic field from the main magnetic pole applied to the magnetic film which comprises the microwave generator 45 may be reduced without a large reduction in the magnetic field strength applied to the medium.

Figure 6:
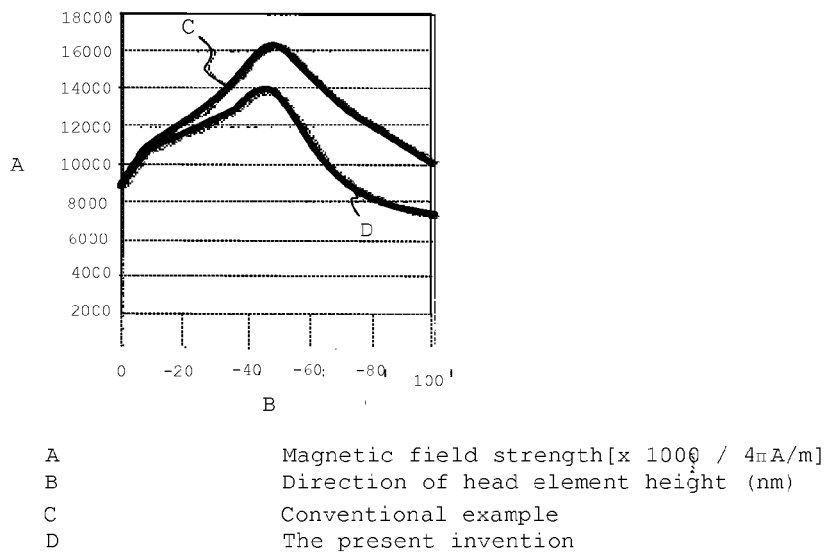
FIG. 6 is a view showing the magnetic field strength applied to the microwave generator, according to embodiment.

FIG. 6 is a graph of the results of the three-dimensional magnetic field calculation which calculates the magnetic field strength applied to the position of the magnetic film constituting the microwave generator 45 according to one embodiment.

The computation conditions are as follows. The magnetic field generated by the main magnetic pole 321 which includes the pole section 327 is calculated by a three-dimensional magnetic field calculation. The interval between the pole section 327 of the main magnetic pole 321 and the magnetic body 38 on the trailing side is 35 nm. In the calculation, a magnetic body is assumed to be on both sides in the width direction of the pole section 327 of the main magnetic pole 321, and the interval therebetween is 120 nm. The width on the trailing side end of the end surface 327a of the main magnetic pole 321 is 75 nm. A bevel angle α of 11° is provided at the end surface 327a of the main magnetic pole 321. The width on the leading side end is narrower than the width on the trailing side end and forms an inverted trapezoid shape. The length in the X direction of the end surface 327a of the main magnetic pole 321 is 100 nm. The material of the pole section 327 of the main magnetic pole 321 is assumed to be CoNiFe. The saturation magnetic flux density is set to 2.4 T and the magnetic permeability to 500. The yoke 326 of the main magnetic pole 321 is assumed to be 80 atomic % Ni-20 atomic % Fe having a saturated magnetic flux density of 1.0 T. The auxiliary magnetic pole 325 is assumed to be a material having a saturated magnetic flux density of 1.0 T, and has a 30-μm width in the Y direction, a 16-μm length in the Z direction, and a 2-μm length in the X direction. The bending angle θ from the flare point of the main magnetic pole 327 is set to 45°. When the angle 41 is large, the magnetic field applied to the magnetic film of the microwave generator 45 decreases, but the recording magnetic field from the magnetic pole which is applied to the recording medium tends to decrease, also.

In addition, the magnetic shields 343, 344 of the reproducing head and the shield 37 are assumed to be 80 atomic % Ni-20 atomic % Fe which have a saturated magnetic flux density of 1.0 T, and have a 32-μm width in the Y direction, a 16-μm length in the Z-direction, and a 1.5-μm length in the X direction. The magnetic material of the magnetic body 38 is assumed to be 45 atomic % Ni-55 atomic % Fe, and have a saturated magnetic flux density of 1.7 T and a magnetic permeability of 1000. The thickness of the magnetic body 38 is 150 nm. The number of coils of the coil 329 is 4 turns, and the recording current value is assumed to be 35 mA.

The soft magnetic backing layer 23 of the magnetic disk 2 may be composed of a material having a saturated magnetic flux density of 1.1 T, and the thickness is assumed to be 30 nm. The thickness of the magnetic recording layer 21 is 19 nm. The thickness of the intermediate layer 22 is 20 nm. The flying height of the head slider 10 is assumed to be 11 nm. Consequently, the distance between the head slider 10 and the front surface of the backing layer 23 is 50 nm. The recording magnetic field is calculated as the value at the center position of the magnetic recording layer 21 at a depth of 20.5 nm from the head air bearing surface 10a. In addition, the magnetic field applied to the microwave generator 45 is calculated at the position separated by 20 nm from the main magnetic pole.

The horizontal axis in FIG. 6 is the distance in the height direction of the head element, and the origin 0 is the head air bearing surface. The vertical axis is the magnetic field strength applied to the position of the magnetic film which comprises the microwave generator. Compared to a conventional structure in which the distance between the magnetic film which comprises the microwave generator and the main magnetic pole equals the distance to the top end in the element height direction of the microwave generator from the head air bearing surface, the magnetic field of the arrangement described herein is smaller. Here, the recording magnetic field strength at the center position in the magnetic recording layer is $8.8 \times 10^3$ ($\times 1000/4\pi$ [A/m]) in a conventional structure and $8.4 \times 10^3$ ($\times 1000/4\pi$ [A/m]) in this embodiment, and the decrease in the magnetic field strength is 4.5%. The maximum value of the magnetic field strength applied to the magnetic film which comprises the microwave generator 45 decreases 14.5% to $139 \times 10^3$ ($\times 1000/4\pi$ [A/m]) in this embodiment compared to $16.3\% \times 10^3$ ($\times 1000/4\pi$ [A/m]) in a conventional structure. Thus, compared to the conventional structure, this embodiment has a larger reduction in the magnetic field strength applied to the magnetic film which comprises the microwave generator 45 than the reduction in the recording magnetic field strength, which is a desired effect, according to some embodiments.

Figure 12:
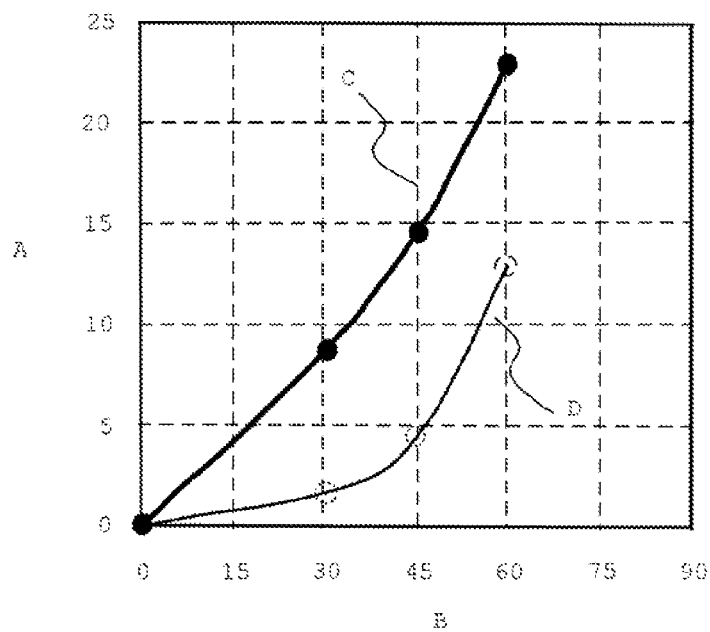
FIG. 12 is a view illustrating various effects of some embodiments.

FIG. 12 illustrates the dependence on angle θ of the main magnetic pole due to the difference between D1 and D2 in the reductions [%] in the magnetic fields at the microwave generation position and the recording layer position in some structures, according to some approaches, compared to the conventional structure. When θ exceeds 30 to 45°, the percentage changes in the reductions in the magnetic fields at the microwave generation position and the recording layer position become equal. If this is considered to be the percentage improvement in the reductions in the magnetic fields at the microwave generation position and the recording layer position, the difference between D1 and D2 should be provided so that θ becomes 30 to 45°.

In Japanese Unexamined Patent Application Publication No. 2008-277586, the magnetic pole is depicted as curved, but a flare point is not specified, and the problems described regarding conventional designs is not addressed. Consequently, the effects of some embodiments described herein are not obtained in Japanese Unexamined Patent Application Publication No. 2008-277586.

Figure 7A:
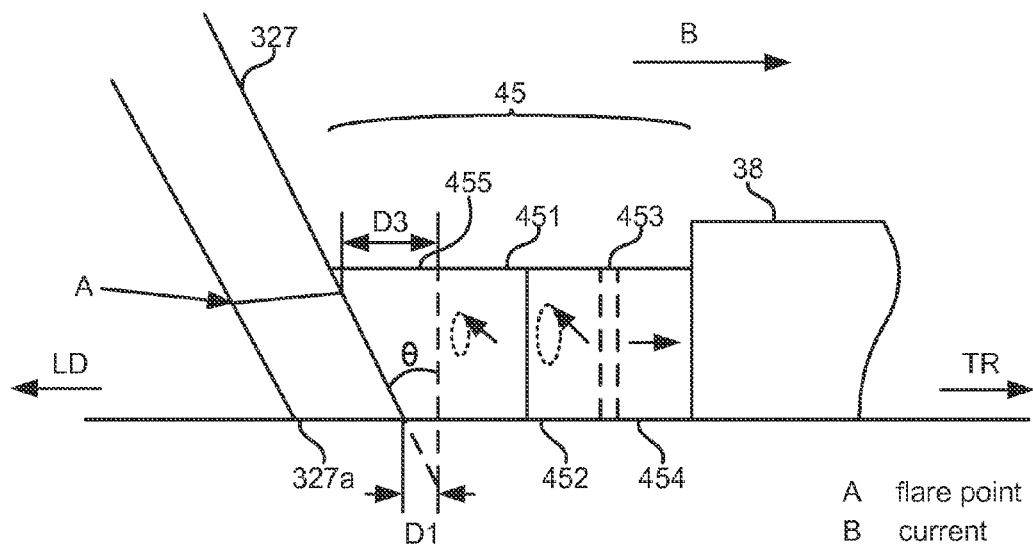
FIG. 7A is a view showing an example of the structure of the main magnetic pole and the microwave generator in a magnetic head, according to one embodiment.

FIG. 7A is an enlarged cross-sectional view showing another embodiment of the main magnetic pole and the microwave generator in the magnetic recording head. In this embodiment, the pole section of the main magnetic pole is formed at an incline at an angle of θ with respect to the surface perpendicular to the air bearing surface (surface parallel to the film surface of the vertical magnetic anisotropic body 451 of the microwave generator 45) from the end surface 327a to a position above the flare point. In some approaches, as shown in FIG. 7A, the distance between film surfaces D3 of the magnetic film which comprises the microwave generator 45 at the flare point of the main magnetic pole and the trailing end of the main magnetic pole section 327 may be larger than the distance between film surfaces D1 of the main magnetic pole and the magnetic film which comprises the microwave generator 45 at the head air bearing surface. This kind of arrangement enables a decrease in the magnetic field which leaks from the flare and is applied to the magnetic film which comprises the microwave generator 45.

Figure 7B:
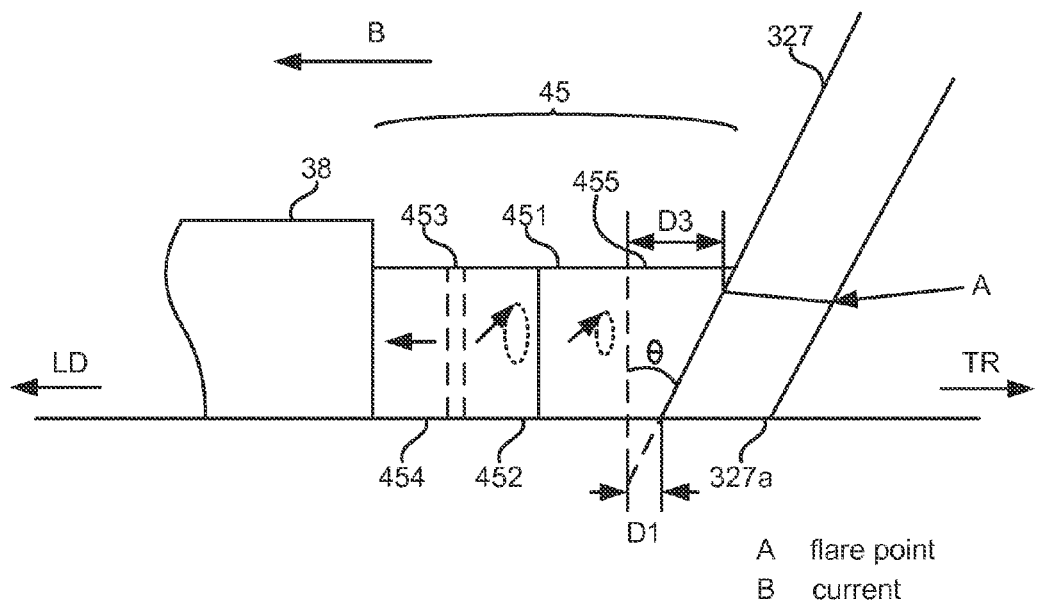
FIG. 7B is a view showing an example of the structure of the main magnetic pole and the microwave generator in a magnetic head, according to another embodiment.

FIG. 7B is an enlarged cross-sectional view showing yet another embodiment of the main magnetic pole and the microwave generator in the magnetic recording head. In this embodiment, the pole section of the main magnetic pole is positioned towards the trailing side TD and formed at an incline at an angle of θ with respect to the surface perpendicular to the air bearing surface (surface parallel to the film surface of the vertical magnetic anisotropic body 451 of the microwave generator 45) from the end surface 327a to a position above the flare point. In some approaches, as shown in FIG. 7B, the distance between film surfaces D3 of the magnetic film which comprises the microwave generator 45 at the flare point of the main magnetic pole and the leading end of the main magnetic pole section 327 may be larger than the distance between film surfaces D1 of the main magnetic pole and the magnetic film which comprises the microwave generator 45 at the head air bearing surface. This kind of arrangement enables a decrease in the magnetic field which leaks from the flare and is applied to the magnetic film which comprises the microwave generator 45.

Figure 8:
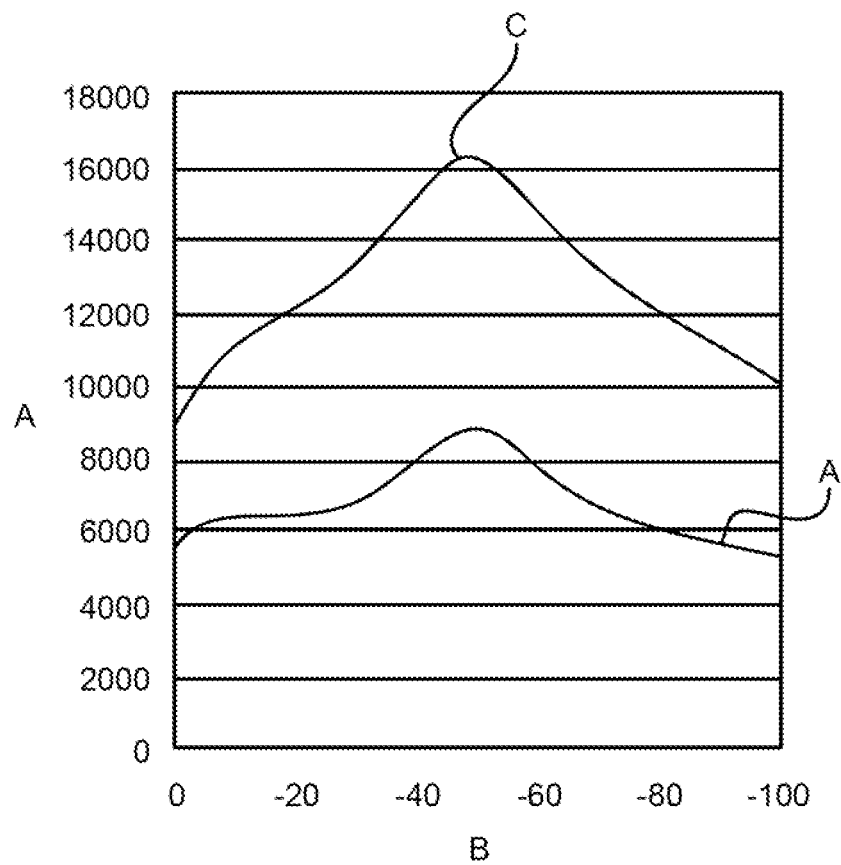
FIG. 8 is a view showing the magnetic field strength applied to the microwave generator, according to one embodiment.

FIG. 8 illustrates the results of the magnetic field calculation for the structure in FIG. 7, according to some approaches the horizontal axis in FIG. 8 is the position in the height direction of the head element and the origin 0 corresponds to the head an bearing surface. The vertical axis is the magnetic field strength in the in-plane direction. The bending angle θ from the air bearing surface 327a of the pole section 327 of the main magnetic pole is set to 45°. Conditions such as the magnetic characteristics and the film thickness of each film used in the calculation are the same as those for FIG. 6.

It is clear from FIG. 8 that the magnetic field, applied to the magnetic film which comprises the microwave generator 45 is less than that in a conventional structure even for the arrangement shown in FIG. 7. Here, the recording magnetic field strength at the center position of the magnetic recording layer is $8.8 \times 10^3$ ($\times 1000/4\pi$ [A/m]) in a conventional structure and $6.7 \times 10^3$ ($\times 1000/4\pi$ [A/m]) in this embodiment, and the decrease in the magnetic field strength is 24%. The maximum value of the magnetic field applied to the magnetic film which comprises the microwave generator 45 decreases 46% to $8.8 \times 10^3$ ($\times 1000/4\pi$ [A/m]) in this embodiment from $16.3 \times 10^3$ ($\times 1000/4\pi$ [A/m]) in a conventional structure. According to this embodiment, the reduction in the magnetic field applied to the magnetic film which comprises the microwave generator 45 is larger than the reduction in the recording magnetic field strength, which is an effect of the present invention.

Figure 13:
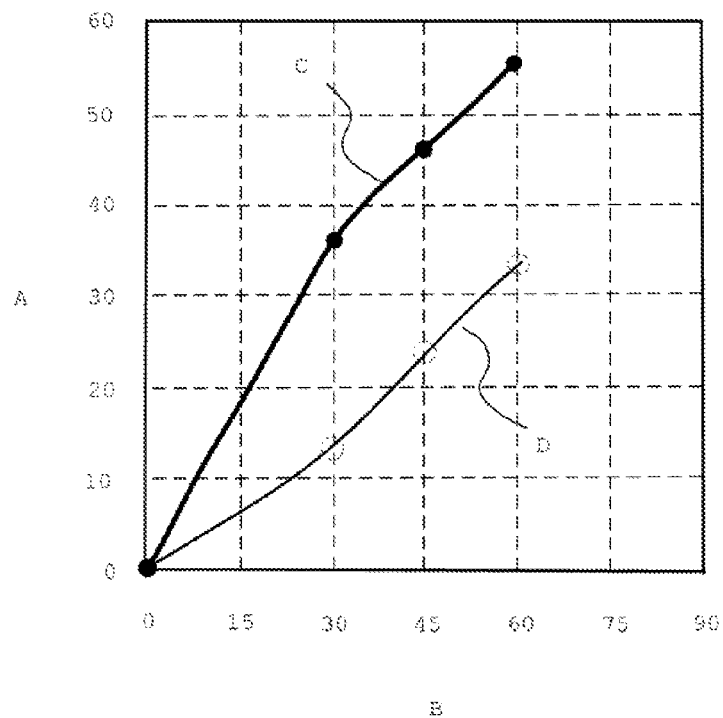
FIG. 13 is a view illustrating various effects of some embodiments.

The dependence on angle θ of the main magnetic pole was shown to be caused by the difference between D1 and D3 in the reductions (%) in the magnetic fields at the microwave generation position and the recording layer position in the structure according to some approaches compared to the conventional structure, as shown in FIG. 13. If θ exceeds 30°, the percentage changes in the reductions in the magnetic fields at the microwave generation position and the recording layer position become equal. If this is considered to be the percentage improvement in the reductions in the magnetic fields at the microwave generation position and the recording layer position, the difference between D1 and D3 should be provided so that θ becomes 30°.

Figure 9A:
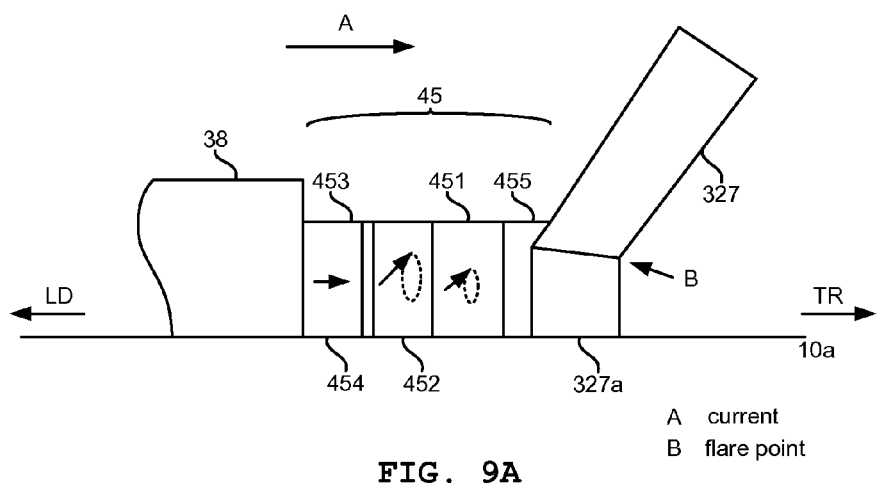
FIG. 9A is a view showing an example of the structure of the main magnetic pole and the microwave generator in a magnetic head, according to one embodiment.

FIG. 9A is an enlarged cross-sectional view showing another embodiment of the main magnetic pole and the microwave generator in the magnetic recording head. In this embodiment, the magnetic film which comprises the microwave generator 45 is arranged on the leading, side of the main magnetic pole 327. An electrode 39 is arranged on the leading, side of the magnetic film which comprises the microwave generator 45, and causes the flow of microwave excitation current.

Figure 9B:
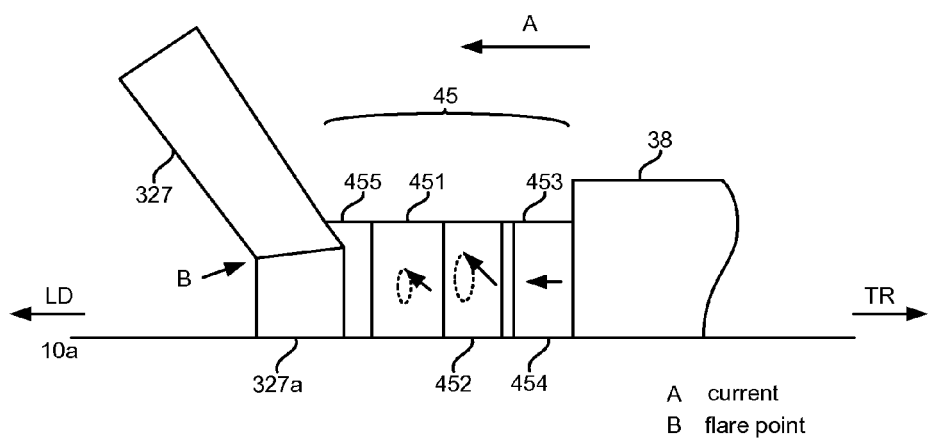
FIG. 9B is a view showing an example of the structure of the main, magnetic pole and the microwave generator in a magnetic head, according to another embodiment.

FIG. 9B is an enlarged cross-sectional view showing yet another embodiment of the main magnetic pole and the microwave generator in the magnetic recording head. In this embodiment, the magnetic film which comprises the microwave generator 45 is arranged on the trailing side of the main magnetic pole 327. An electrode 39 is arranged on the trailing side of the magnetic film which comprises the microwave generator 45, and causes the flow of microwave excitation current.

Figure 10:
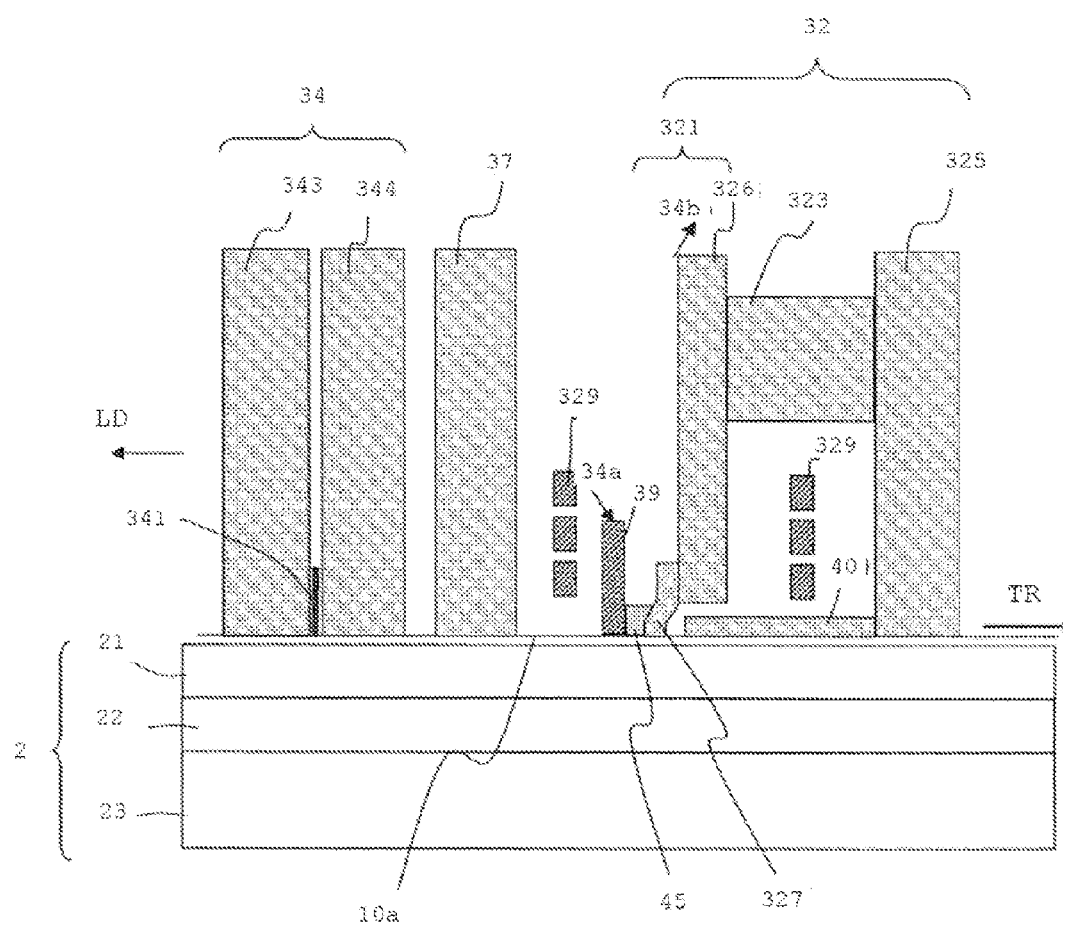
FIG. 10 is a cross-sectional view of a magnetic head related to one embodiment.

FIG. 10 is a schematic cross-sectional view showing the entire structure of the head when the microwave generator 45 is arranged on the leading side of the main magnetic pole 321, according to one embodiment. A magnetic body 40 may be arranged to improve the magnetic field gradient on the trailing side of the main magnetic pole. An advantage is that when the magnetic film which comprises the microwave generator 45 is arranged, on the leading side of the main magnetic pole 327, the magnetic body 40 arranged on the trailing side of the main magnetic pole can be provided with the objective of only improving the magnetic field gradient. In addition, since the microwave excitation current flows through the electrode 39 on the leading side, the insulator 324 shown in FIG. 3 may be omitted, and the magnetic resistance can decrease, and the efficiency improves.

The manufacture of the main magnetic pole adopted in some embodiments includes a process in which a non-magnetic layer is formed after the magnetic film of the main magnetic pole is fabricated at an incline, and then the nonmagnetic layer is planarized. The planarization method can be chemical mechanical polishing, etc.

Figure 11:
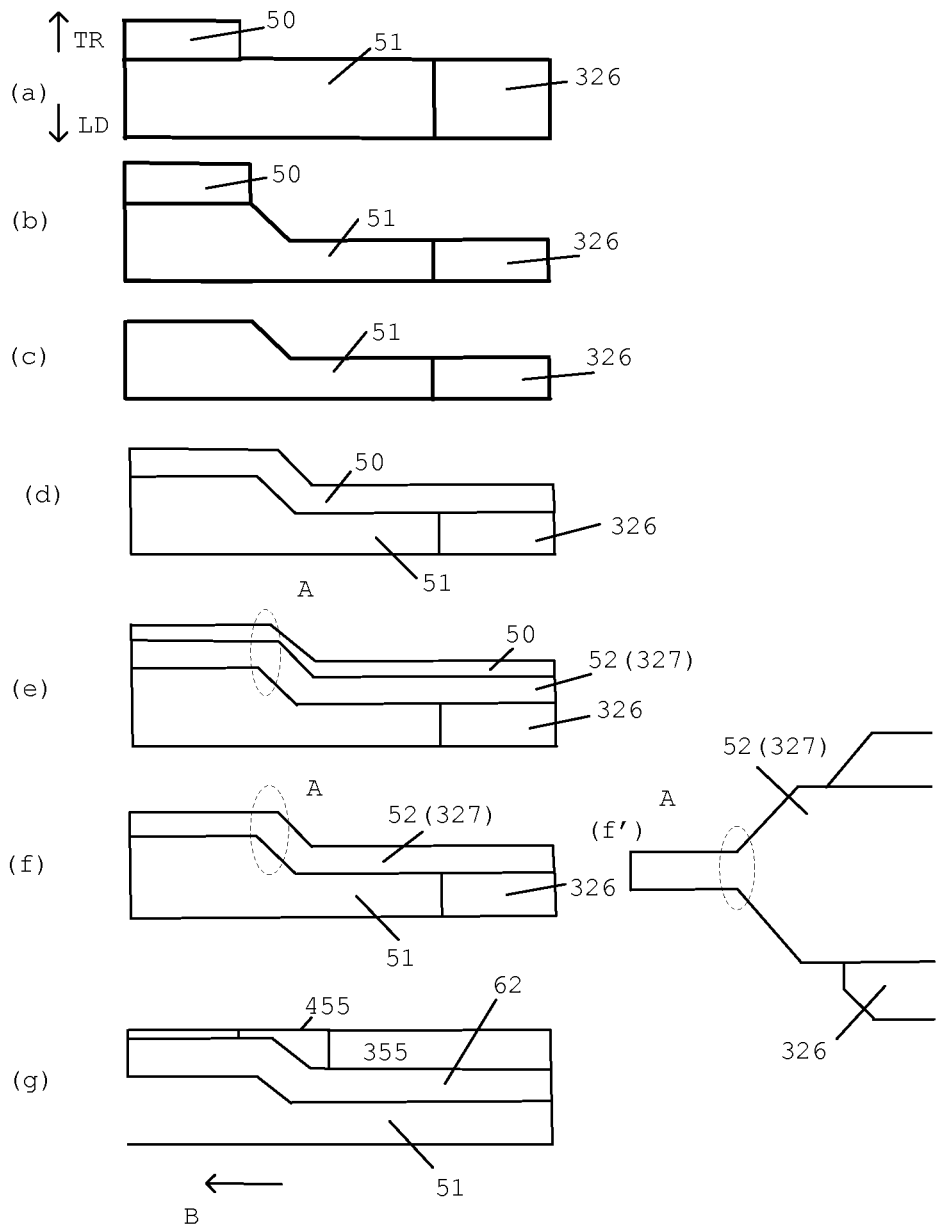
FIG. 11 is a view showing a manufacturing process of the main magnetic pole according to one embodiment.

FIG. 11 shows an example of the manufacturing process of the main magnetic pole, according to one embodiment. The column on the left side of the drawing illustrates the cross-sections in the head advancing direction. The drawing on the right side shows the air bearing surface. FIG. 11 shows only the manufacturing process of the pole section of the main magnetic pole depicted in FIGS. 3 and 4.

FIG. 11(a) illustrates the formation of an inorganic insulating film 51 after the coil was formed or after the main magnetic pole yoke was formed, and the formation of a resist pattern 50 on the film, according to one embodiment. Next, as shown in FIG. 11(b), the resist pattern 50 is used as a mask, and the inorganic insulating film 51 is etched, according to one embodiment. When $Al_2O_3$ is used as the inorganic insulating film 51, a gas mixture of $BCl_3$ or $BCl_1$ and $Cl_2$ may be used as the etching gas, according to one embodiment. In addition, when AlN is used, the above-mentioned chlorine gases may be used, according to one embodiment. When $Ta_2O_5$, TiC, $TiC_2$, $SiO_2$, or SiO, etc., is used as the inorganic insulating film 51, a fluorine such as $CHF_3$, $CF_4$, $SF_6$, $C_4F_8$ can be used as the etching gas, according to one embodiment. FIG. 11(c) shows the state after the resist has been removed by etching.

Next, as shown in FIG. 11(d), a resist pattern for forming the main magnetic pole shape is formed, according to one embodiment. Then as shown in FIG. 11(e), a magnetic film 52 is plated, according to one embodiment. FIG. 11(f) shows the state after resist removal, according to one embodiment. FIG. 11(f) is a top view when viewed from the trailing side, according to one embodiment. Non-magnetic metal shapes having the desired dimensions and an inorganic insulating film 355 are formed. As shown in FIG. 11(g), after planarization by, for example, chemical mechanical polishing, the remaining layers of the microwave generator 45 are formed, according to one embodiment. This manufacturing method can manufacture the magnetic head described herein, according to various embodiments.

According to one preferred embodiment, a method for forming a portion of a magnetic head includes forming a main magnetic pole, forming a nonmagnetic film above an air bearing surface end of the main magnetic pole, and forming a magnetic film comprising a microwave generator above the nonmagnetic film. According to some approaches, a first distance in an element thickness direction between film surfaces of the magnetic film and the main magnetic pole at an end of the magnetic film opposite an air bearing surface end of the magnetic film is greater than a second distance in an element thickness direction between film surfaces of the magnetic film and the main magnetic pole at the air bearing surface end of the magnetic film.

In another embodiment, the main magnetic pole may be formed parallel to the magnetic film from the air bearing surface to a position lower than a height of the magnetic film in an element height direction.

According to more approaches, a surface of the main magnetic pole opposite the surface of the magnetic film may form an angle of between about 30° and about 45° to an angle normal to the air bearing surface from a flare point in an element height direction.

Additionally, in some embodiments, the microwave generator may be positioned on a trailing side of the main magnetic pole. Alternatively, the microwave generator may be positioned on a leading side of the main magnetic pole.

In more approaches, the main magnetic pole has a shape in which a width is nearly constant from the air bearing surface end to a flare point of the main magnetic pole. Also, the main magnetic pole gradually widens from the flare point in an element height direction, and a first distance between film surfaces of the magnetic film at the flare point of the main magnetic pole and the main magnetic pole is greater than a second distance between film surfaces of the magnetic film on an air bearing surface end of the magnetic film and the main magnetic pole.

The process for forming the magnetic film shown in FIG. 11(e) may be a process in which magnetron sputtering is used with the photoresist as the mask, according to one embodiment.

Figure 14:
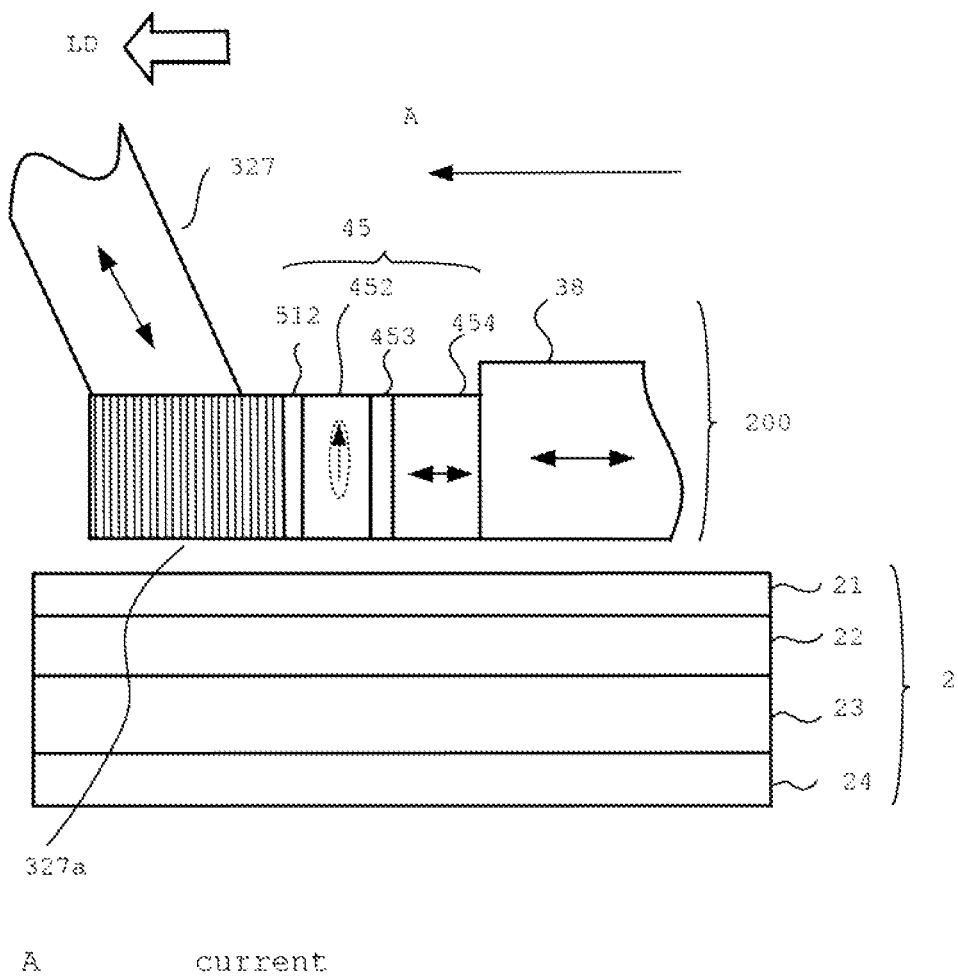
FIG. 14 is a cross-sectional view of a portion of a magnetic head, according to one embodiment.

According to another embodiment, and with reference to FIGS. 14-17, a magnetic recording head is described. FIG. 14 shows a cross-sectional structure of the periphery of the recording mechanism when the recording head and the recording medium are cut perpendicular to the surface of the recording medium (vertical direction in the drawing) and in the plane recording parallel to the advance, direction of the head (track direction which is the direction to the left in the drawing), according to one embodiment. In the recording head 200, a magnetic circuit is constructed in the top part of the drawing between the pole section 327 and the magnetic pole 38. However, the upper portion of the head 200 is electrically insulated, for the most part. The magnetic circuit is a closed circuit formed by magnetic lines of force and is not required to be formed by only a magnetic body. The structure is such that an electrical, pole or some other mechanism for providing electrical contact to an electrical pole is provided in the pole section and the magnetic pole 38. Also, the microwave excitation current flows through the magnetized high-speed rotor 452 from the magnetic pole 38 side to the pole section 327 side. A metal non-magnetic spin scattering body 512, the magnetized high-speed rotor 452, a metal non-magnetic spin conducting liner 453, a vertically magnetized film 454, and the magnetic pole 38 are formed in layers adjacent to the front edge of the pole section 327. If a negative vertically magnetic anisotropic material such as a (Co/Fe)n artificial lattice film is used in the magnetized high-speed rotor 452, high-speed rotation of the magnetization is stabilized. Magnetic pole 38 may be used as a trailing shield. During a write operation, the magnetization of the vertically magnetized film 454 is reversed following the reversals of the magnetizations of the pole section 327 and the magnetic pole 38. The soft magnetic backing layer 23, the intermediate layer 22, and the magnetic recording layer 21 are formed on a substrate 24 in the recording medium 2. A 10 nm CoCrPt—SiO$_x$ layer having a magnetically anisotropic magnetic field of 2.4 MA/m (30 kOe) may be used in the magnetic recording layer 21. A spin stand was used, and magnetic recording was conducted at a 20 m/s relative speed of the head medium, a 5 nm agnetic spacing, and a 35 mm track pitch, followed by reproduction by a GMR head having a shield interval of 25 nm. When the high-frequency excitation current was varied, and the signal-to-noise ratio at 1250 kFCI was measured, a maximum of about 13.0 dB was obtained. It was found that satisfactory recording reproduction could be achieved at a recording density exceeding about 1.8 Tbits/in$^2$. The high frequency at this time was about 27.0 GHz. For comparison, when the same measurement was made for a head which did not form an angle (i.e., θ=0° in FIG. 4) with the pole section 327, which is the conventional structure, the signal-to-noise ratio at 1250 kFCI was only about 10.0 dB.

Figure 15:
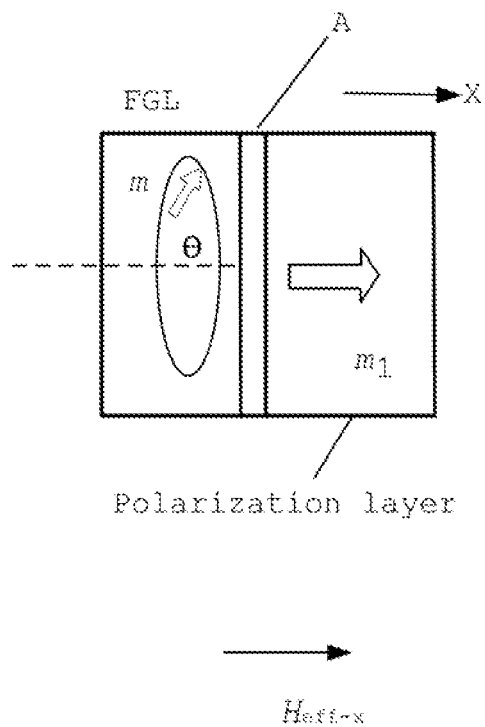
FIG. 15 is an illustration of a field generation layer (FGL) according to one embodiment.

With one objective being to understanding, aspects of certain embodiments, the operation of the magnetization of the magnetized high-speed rotor 452 was analyzed. Equation 1, which considers the effect of spin torque in the Landau-Lifschitz-Gilbert (LLG) equation, was used to examine the behavior of the magnetization (m) of the field generation layer (FGL) as shown in FIG. 15.

$$\frac{dm}{dt} = -\gamma m \times H_{\text{eff}} + \alpha m \times \frac{dm}{dt} + \gamma \beta(\theta) I \cdot m \times (m \times m_1) \quad \text{Equation 1}$$

$$\beta(\theta) = \frac{2\mu_B}{\gamma e V M_s} g(\theta),$$

$$\text{for GMR } g(\theta) = \left[-4 + \frac{(1+P)^3(3+\cos\theta)}{4P^{3/2}}\right]^{-1}$$

where γ is the gyromagnetic constant; α (assumed to be 0.01) is the damping constant; I is the current; μB is the Bohr magneton; e is the elementary charge; V is the volume of the FGL; and Ms (assumed to be 1.9 T) is the magnetization of the FGL. The effective magnetic field $H_{\text{eff}}$ is constructed from the sum of the three components of the magnetically anisotropic magnetic field. $H_a$ (which equals $H_k \cos\theta$, where θ is the angle formed by the magnetization and the axis of easy magnetization), the reverse magnetic field $H_d$, and the external magnetic field $H_{ext}$. The axis of easy magnetization is in the direction of the x-axis and assumed to have negative magnetic anisotropy (Hk=−800 kA/m). In addition, the magnetization (m1) of the polarization layer is oriented in the x-direction and has a polarization (P) of 0.244. The steady-state rotating solution was determined when the magnetization of the spin torque source and the effective magnetic field were perpendicular to the rotating surface of the FGL. If the magnetic field applied perpendicular (x-direction) to the rotating surface of the magnetized high-speed rotor 452 is $H_{\text{eff-}x}$, the rotational frequency f becomes:

$$2\pi f = \gamma H_{\text{eff-}x} \quad \text{Equation 2}$$

Therefore, an advantage of this embodiment was found to be that the magnetic field component flowing in perpendicular to the magnetized high-speed rotor 452 from the pole section 327 increases the rotational frequency. On the other hand, in the investigation results of directly solving Equation 1, if the magnetic field component flowing in parallel into the magnetized high-speed rotor 452 from the pole section exceeds 3000 (×1000/4π A/m), the magnetization of the magnetized high-speed rotor 452 is easily pinned, and the rotation of the magnetization is not stable.

From these determinations, it is believed that improvements may be made when the magnetic field flowing in from the pole section 327 into the magnetized high-speed rotor 452 has a larger component flowing in perpendicular and a smaller component flowing in parallel. Therefore, it is believed to be effective when the magnetic field produced by the side surface directly above the flare point of the pole section 327 does not enter the magnetized high-speed rotor 452. The end of the magnetic pole 38 on the pole section 327 side may be separated further from the ABS side than the flare point of the pole section 327.

The implemented structure, as described above according to one embodiment, is shown in FIG. 16, and the magnetic field strengths flowing into the magnetized high-speed rotor 452 are shown in Table 1 where $H_w$ is the recording magnetic field, strength. $H_g$ is the magnetic field strength applied to the magnetic film 452 forming the microwave generator, $H_{gx}$ is the longitudinal component of $H_g$, and $H_{gy}$ is the transverse component of $H_g$.

TABLE 1

|   | $H_w$ | $H_g$ | $H_{gx}$ | $H_{gy}$ | S/N |
|---|-------|-------|----------|----------|-----|
| A | 8.8   | 16.3  | 15.6     | 4.6      | △   |
| B | 8.4   | 13.9  | 13.7     | 2.5      | ○   |
| C | 8.6   | 15.1  | 14.9     | 2.3      | ○   |
| D | 8.7   | 15.6  | 15.4     | 2.4      | ◎   |
| E | 8.5   | 14.7  | 14.6     | 1.9      | ○   |

[10$^3$ × 1000/4π A/m]

FIG. 16(A) shows the conventional structure. The rotation of the magnetization is considered not to be stable because the magnetic field component $H_{gy}$ flowing in parallel into the magnetized high-speed rotor 452 is large at about 4.6 (10× 1000/4π A/m). FIG. 16(B) illustrates a simplified view of the structure shown in FIG. 14. $H_{gy}$ becomes small at about 2.5 (10×1000/4π A/m), and stable rotation of magnetization is expected to be obtained. However, in FIG. 16(B), the magnetic field component $H_{gx}$ flowing in perpendicular into the magnetized high-speed rotor 452 becomes small at about 13.7 (10$^3$×1000/4π A/m), and cannot increase the oscillation frequency, and is applied to writing to a recording medium having comparatively small magnetic anisotropy. Compared to FIG. 16(B), in FIGS. 16(C)-16(E), $H_{gy}$ is smaller, $H_{gx}$ is larger, the rotation of magnetization of the magnetized high-speed rotor 452 is stable, and writing to a recording medium having large magnetic anisotropy is possible. In particular, in FIG. 16(D) where only the end of the magnetic pole 38 on the pole section 327 side is separated further from the ABS side than the flare point of the pole section 327, $H_{gx}$, is about 14.6 ($10^3 \times 1000/4\pi$ A/m), $H_{gy}$, is about 2.4 ($10^3 \times 1000/4\pi$ A/m), and an excellent signal-to-noise ratio is obtained (about 17.0 dB signal-to-noise ratio at 1250 kFCI). In addition, in the structure in FIG. 16(E) in which a bypass magnetic body 211 is formed to cover the top of the microwave generator 45 and the magnetic field from the side surface of the pole section 327 flows into the magnetic pole 38, the effect of suppressing $H_{gy}$ is significant.

FIG. 17 is the head in FIG. 16(C) viewed in the direction of the pole section 327 from the end surface (dot dashed line) of the magnetic pole 38 on the pole section 327 side. The magnetic field generated from the side surface directly above the flare point of the pole section 327 can be expected to not enter the magnetized high-speed rotor 452 and flow into the magnetic pole 38 because the end member of the magnetic pole 38 on the pole section 327 side is separated further from the ABS surface than the flare point of the pole section 327.

It should be noted that methodology presented herein for at least some of the various embodiments may be implemented, in whole or in part, in computer hardware, software, by hand, using specialty equipment, etc., and combinations thereof.

Embodiments of the present invention were described above, but the present invention is not limited to the above-mentioned embodiments, and, naturally, implementations having various modifications are possible to a person skilled in the art.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
   a magnetized high-speed rotor positioned at a media-facing surface; and
   a main magnetic pole positioned near the magnetized high-speed rotor at the media-facing surface, the main magnetic pole being aligned with the magnetized high-speed rotor along a track direction, wherein a side surface of the main magnetic pole facing the magnetized high-speed rotor is inclined away from the magnetized high-speed rotor in the track direction,
   wherein information is recorded by generating a high-frequency magnetic field from the magnetized high-speed rotor and switching the magnetic head between a magnetic resonance state and a magnetization state, and
   wherein the magnetic head reduces leaking for magnetic fields applied parallel to a magnetized rotating surface of the magnetized high-speed rotor from the main magnetic pole.

2. The magnetic head according to claim 1, wherein the main magnetic pole generates a magnetized rotating magnetic field.

3. The magnetic head according to claim 2, wherein the magnetized high-speed rotor is positioned on a leading side of the main magnetic pole.

4. The magnetic head according to claim 2, wherein the magnetized high-speed rotor is positioned on a trailing side of the main magnetic pole.

5. The magnetic head according to claim 1, wherein a height in an element height direction of a magnetic pole opposite the main magnetic pole is greater than a distance from the media-facing surface to a flare point of the main magnetic pole.

6. The magnetic head according to claim 1, wherein the main magnetic pole is positioned on a leading side of the magnetized high-speed rotor.

7. The magnetic head according to claim 1, wherein the main magnetic pole is positioned on a trailing side of the magnetized high-speed rotor.

8. The magnetic head according to claim 1,
   wherein the main magnetic pole generates a reverse magnetic field, and
   wherein a height of a magnetic pole opposite the main magnetic pole is greater at the media-facing surface than at a flare point of the main magnetic pole.

9. The magnetic head according to claim 8, further comprising a magnetic film provided near an air bearing surface end of the main magnetic pole and positioned between the main magnetic pole and the magnetized high-speed rotor, wherein a first distance between film surfaces of the magnetic film and the main magnetic pole at a flare point of the main magnetic pole is greater than a second distance between film surfaces of the magnetic film and the main magnetic pole at an air bearing surface end of the magnetic film.

10. The magnetic head according to claim 8,
    wherein a bypass magnetic path is formed from near a side surface of the main magnetic pole toward the magnetic pole opposite the main magnetic pole, and
    wherein a distance from the media-facing surface on an end separated from the media-facing surface of the bypass magnetic path is greater than a distance from the media-facing surface to the flare point of the main magnetic pole.

11. The magnetic head according to claim 10, wherein the magnetized high-speed rotor is positioned on a leading side of the main magnetic pole.

12. The magnetic head according to claim 10, wherein the magnetized high-speed rotor is positioned on a trailing side of the main magnetic pole.

13. The magnetic head according to claim 8, wherein the main magnetic pole is positioned on a leading side of the magnetized high-speed rotor.

14. The magnetic head according to claim 8, wherein the main magnetic pole is positioned on a trailing side of the magnetized high-speed rotor.

15. A disk drive system, comprising:
    a magnetic storage medium;
    at least one magnetic head as recited in claim 8 configured to write data to the magnetic storage medium;
    a slider configured to support the at least one magnetic head;
    a drive mechanism configured to pass the magnetic storage medium over the at least one magnetic head; and
    a control unit coupled to the at least one magnetic head configured to control operation of the at least one magnetic head.

16. A disk drive system, comprising:
    a magnetic storage medium;
    at least one magnetic head configured to write data to the magnetic storage medium, each of the at least one magnetic head comprising:
       a magnetized high-speed rotor positioned at a media-facing surface; and
       a main magnetic pole positioned near the magnetized high-speed rotor at the media-facing surface, the main magnetic pole being aligned with the magnetized high-speed rotor along a track direction, wherein a side surface of the main magnetic pole facing the magnetized high-speed rotor is inclined away from the magnetized high-speed rotor in the track direction, wherein information is recorded by generating a high-frequency magnetic field from the magnetized high-speed rotor and switching the magnetic head between a magnetic resonance state and a magnetization state, and wherein each of the at least one magnetic head reduces leaking for magnetic fields applied parallel to a magnetized rotating surface of the magnetized high-speed rotor from the main magnetic pole;

a slider configured to support the at least one magnetic head;

a drive mechanism configured to pass the magnetic storage medium over the at least one magnetic head; and a control unit coupled to the at least one magnetic head configured to control operation of the at least one magnetic head.

17. A magnetic head, comprising:

a magnetized high-speed rotor positioned at a media-facing surface; and a main magnetic pole positioned near the magnetized high-speed rotor at the media-facing surface, the main magnetic pole being aligned with the magnetized high-speed rotor along a track direction, wherein a side surface of the main magnetic pole facing the magnetized high-speed rotor is inclined away from the magnetized high-speed rotor in the track direction, wherein the main magnetic pole generates a magnetized rotating magnetic field, wherein information is recorded by generating a high-frequency magnetic field from the magnetized high-speed rotor and switching the magnetic head between a magnetic resonance state and a magnetization state, wherein the magnetic head reduces leaking for magnetic fields applied parallel to a magnetized rotating surface of the magnetized high-speed rotor from the main magnetic pole, and wherein a height in an element height direction of a magnetic pole opposite the main magnetic pole is greater than a distance from the media-facing surface to a flare point of the main magnetic pole.

18. The magnetic head according to claim 17, wherein the magnetized high-speed rotor is positioned on a leading side of the main magnetic pole.

19. The magnetic head according to claim 17, wherein a height in an element height direction of a magnetic pole opposite the main magnetic pole is greater than a distance from the media-facing surface to a flare point of the main magnetic pole, and wherein the magnetized high-speed rotor is positioned on a trailing side of the main magnetic pole.

* * * * *